United States Patent
Zhang et al.

(10) Patent No.: US 12,469,142 B2
(45) Date of Patent: Nov. 11, 2025

(54) INFORMATION PROCESSING DEVICE AND INFORMATION PROCESSING METHOD

(71) Applicant: OMRON Corporation, Kyoto (JP)

(72) Inventors: Chao Zhang, Kyoto (JP); Masaru Usunami, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 340 days.

(21) Appl. No.: 18/247,289

(22) PCT Filed: Sep. 3, 2021

(86) PCT No.: PCT/JP2021/032490
§ 371 (c)(1),
(2) Date: Mar. 30, 2023

(87) PCT Pub. No.: WO2022/091577
PCT Pub. Date: May 5, 2022

(65) Prior Publication Data
US 2023/0419500 A1    Dec. 28, 2023

(30) Foreign Application Priority Data

Oct. 27, 2020    (JP) ................. 2020-179823

(51) Int. Cl.
| | | |
|---|---|---|
| G06V 40/10 | (2022.01) | |
| G06T 7/12 | (2017.01) | |
| G06T 7/246 | (2017.01) | |
| G06V 10/44 | (2022.01) | |

(52) U.S. Cl.
CPC ............... *G06T 7/12* (2017.01); *G06T 7/246* (2017.01); *G06V 10/44* (2022.01); *G06V 40/10* (2022.01); *G06T 2207/30196* (2013.01)

(58) Field of Classification Search
CPC ............... G06T 7/0012; G06T 7/246; G06T 2207/30196; G06V 40/10; G06V 10/44
See application file for complete search history.

(56) References Cited

U.S. PATENT DOCUMENTS

| | | | |
|---|---|---|---|
| 4,537,659 A | 8/1985 | Koski | |
| 2007/0195089 A1* | 8/2007 | Furukado | ........... G06T 7/73 |
| | | | 345/426 |

FOREIGN PATENT DOCUMENTS

| | | | |
|---|---|---|---|
| CN | 102542552 A | 7/2012 | |
| CN | 106778766 A | 5/2017 | |
| CN | 109596129 A | 4/2019 | |
| JP | H06294808 A | 10/1994 | |
| JP | H07105371 A | 4/1995 | |
| JP | H09128548 A | 5/1997 | |

(Continued)

OTHER PUBLICATIONS

International Search Report issued in Intl. Appln. No. PCT/JP2021/032490 mailed Nov. 30, 2021. English translation provided.

(Continued)

*Primary Examiner* — Shaghayegh Azima

(74) *Attorney, Agent, or Firm* — ROSSI, KIMMS & McDOWELL LLP

(57) ABSTRACT

An information processing device includes a detector that detects a feature area with a predetermined feature from a captured image, and a separator that separates the feature area along a principal inertia axis of the feature area.

11 Claims, 9 Drawing Sheets

(56) References Cited

FOREIGN PATENT DOCUMENTS

| JP | 2002251613 A | | 9/2002 |
|---|---|---|---|
| JP | 2006166107 A | | 6/2006 |
| JP | 2008245063 A | * | 10/2008 |
| JP | 2011043969 A | * | 3/2011 |
| JP | 2012043021 A | * | 3/2012 |

OTHER PUBLICATIONS

Written Opinion issued in Intl. Appln. No. PCT/JP2021/032490 mailed Nov. 30, 2021. English translation provided.

Ogata. "A study of separation of moving objects and their shadows". The Institute of Electronics, Information and Communications Engineers. IEICE Technical Report. Jun. 20, 1997: 33-40. vol. 97, No. 113. Chapter 3. English abstract provided. Cited in NPL1 and NPL2.

Office Action issued in Chinese Appln. No. 202180068094.4 mailed Jul. 22, 2025.

* cited by examiner

INFORMATION PROCESSING DEVICE AND INFORMATION PROCESSING METHOD

TECHNICAL FIELD

The present invention relates to a technique for separating an area detected from a captured image.

BACKGROUND ART

In detecting a predetermined object such as a human from a captured image, an area larger than the area of the predetermined object may be detected, rather than the predetermined object being detected accurately. For example, an area with motions is detected, and an object included in the detected area is identified as a human or as another object. In this case, an area including the object and its shadow may be detected. For the detected area including the object and its shadow, the shadow may lower the accuracy in identifying the object as a human or as another object.

Patent Literature 1 describes a technique for removing a shadow from a background subtraction image (an image including a target object and its shadow) based on a predetermined reference luminance value.

CITATION LIST

Patent Literature

Patent Literature 1: Japanese Unexamined Patent Application Publication No. 2008-245063

SUMMARY OF INVENTION

Technical Problem

An image captured in a dark environment or with backlighting may include an object (target object) with the luminance value close to the luminance value of its shadow, from which the technique described in Patent Literature 1 may not remove the shadow accurately (or may remove at least a part of the object). In other words, the technique described in Patent Literature 1 cannot accurately divide (separate) the area including an object and its shadow into an object area and a shadow area.

In response to the above circumstances, one or more aspects of the present invention are directed to a technique for appropriately separating an area detected from a captured image.

Solution to Problem

The technique according to one or more aspects of the present invention has the structure below.

An information processing device according to a first aspect of the present invention includes a detector that detects a feature area with a predetermined feature from a captured image, and a separator that separates the feature area along a principal inertia axis of the feature area.

In many cases, two objects to be divided (separated) extend in different directions. For example, a person standing on the ground extends in a direction substantially perpendicular to the ground, and the person's shadow extends along the ground. The above structure separates the detected feature area along a principal inertia axis of the feature area. This allows appropriate separation of the feature area (into two separate areas corresponding to the respective intended two objects).

The feature area has two principal inertia axes and may not be separated appropriately depending on the principal inertial axis used for the separation. Thus, when a center of gravity of the feature area is located in a first quadrant or a third quadrant of four quadrants obtained with a horizontal axis and a vertical axis including a center of a rectangle circumscribing the feature area, the separator may separate the feature area along, of two principal inertia axes of the feature area, a principal inertia axis with a smaller declination from the horizontal axis. When the center of gravity of the feature area is located in a second quadrant or a fourth quadrant of the four quadrant, the separator may separate the feature area along, of the two principal inertia axes of the feature area, a principal inertia axis with a greater declination from the horizontal axis. This allows more appropriate (and reliable) separation of the feature area.

The use of a principal inertia axis may be inappropriate in separating, for example, a detected feature area substantially equal to an area of an object that is not to be separated. Such a feature area tends to occupy a large proportion of a rectangle circumscribing the feature area. Thus, the information processing device may further include a determiner that determines whether two separate areas obtained by separating the feature area with the separator are used or the feature area is used. When an evaluation value corresponding to a proportion of the feature area occupying a rectangle circumscribing the feature area is less than a predetermined threshold, the determiner may determine to use the two separate areas. When the evaluation value is greater than or equal to the predetermined threshold, the determiner may determine to use the feature area. This accurately allows more appropriate separation of the feature area (using the resultant separate areas when the feature area is to be separated and using the feature area instead of the resultant separate areas when the feature area is not to be separated).

The evaluation value may be a proportion of a total area of rectangles circumscribing the two separate areas to an area of the rectangle circumscribing the feature area. The evaluation value may be a proportion of a logical sum of areas of rectangles circumscribing the two separate areas to an area of the rectangle circumscribing the feature area.

The information processing device may further include an identifier that identifies an object included in a rectangle circumscribing an area to be used as a predetermined object or another object. When the two separate areas are to be used, the identifier may identify, as the predetermined object or another object, an object included in a rectangle circumscribing each of the two separate areas. This allows accurate identification (detection) of the predetermined object. For example, the feature area including the predetermined object is separated into separate areas similar to the predetermined object area. This more accurately allows identification (detection) of the object included in the rectangle circumscribing the resultant separate areas as the predetermined object than when the rectangle circumscribing the feature area is used.

The predetermined object may be a human. This accurately allows identification (detection) of a human.

The detector may detect an area with a motion as the feature area. The detector may detect an area having a pixel value within a predetermined range as the feature area. The detector may detect an area surrounded by an edge as the feature area.

An information processing method according to a second aspect of the present invention includes detecting a feature area with a predetermined feature from a captured image, and separating the feature area along a principal inertia axis of the feature area.

One or more aspects of the present invention may be directed to an information processing system, a human detection device, or a human detection system including at least a part of the above structure or functions. One or more aspects of the present invention may also be directed to an information processing method, a human detection method, a method for controlling an information processing system or a human detection system including at least one of the above processes, a program for causing a computer to perform such a method, or a non-transitory computer-readable recording medium storing such a program. The present invention may be implemented by combining the above structures and processes in any possible manner unless any technical contradiction arises.

Advantageous Effects of Invention

The technique according to the above aspects of the present invention allows appropriate separation of an area detected from a captured image.

DESCRIPTION OF EMBODIMENTS

Example Use

An example use of a technique according to one or more embodiments of the present invention will be described.

A known technique may inaccurately detect a predetermined object such as a human by detecting an area larger than the area of the predetermined object from a captured image. For example, an area with motions is detected, and an object included in the detected area is identified as a human or as another object. In this case, an area including the object and its shadow may be detected. For the detected area including the object and its shadow, the shadow may lower the accuracy in identifying the object as a human or as another object.

A known technique to separate a detected area based on a luminance value may not appropriately separate the area. For example, an image captured in a dark environment or with backlighting may include an object with the luminance value close to the luminance value of its shadow, from which the technique may not accurately divide (separate) the area including the object and its shadow into an object area and a shadow area.

Figure 1:
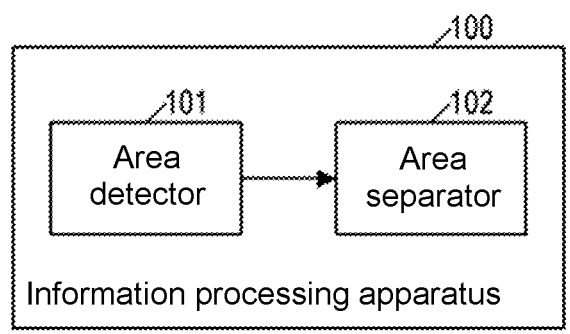
FIG. 1 is a block diagram of an information processing device according to one or more embodiments of the present invention showing an example structure.

FIG. 1 is a block diagram of an information processing device 100 according to an embodiment of the present invention showing an example structure. The information processing device 100 includes an area detector 101 and an area separator 102. The area detector 101 detects a feature area with a predetermined feature from a captured image. The area separator 102 separates the feature area along a principal inertia axis of the feature area detected by the area detector 101. The area detector 101 is an example of a detector in an aspect of the present invention. The area separator 102 is an example of a separator in an aspect of the present invention. The feature area may be, for example, an area with motions, an area with pixel values (e.g., RGB values or luminance values) within a predetermined range, or an area surrounded by edges. In other words, the area with the predetermined feature includes, for example, an area with motions, an area with pixel values within a predetermined range, and an area surrounded by edges. The predetermined range is, for example, a range of possible pixel values of a predetermined object such as a human. An imaging environment (e.g., sunlight or light from an illuminator) varies with time. Thus, the predetermined range may vary with time.

In many cases, two objects to be divided (separated) extend in different directions. For example, a person standing on the ground extends in a direction substantially perpendicular to the ground, and the person's shadow extends along the ground. The above structure separates the detected feature area along a principal inertia axis of the feature area. This allows appropriate separation of the feature area (into two separate areas corresponding to the respective intended two objects).

First Embodiment

A first embodiment of the present invention will be described.

Figure 2:
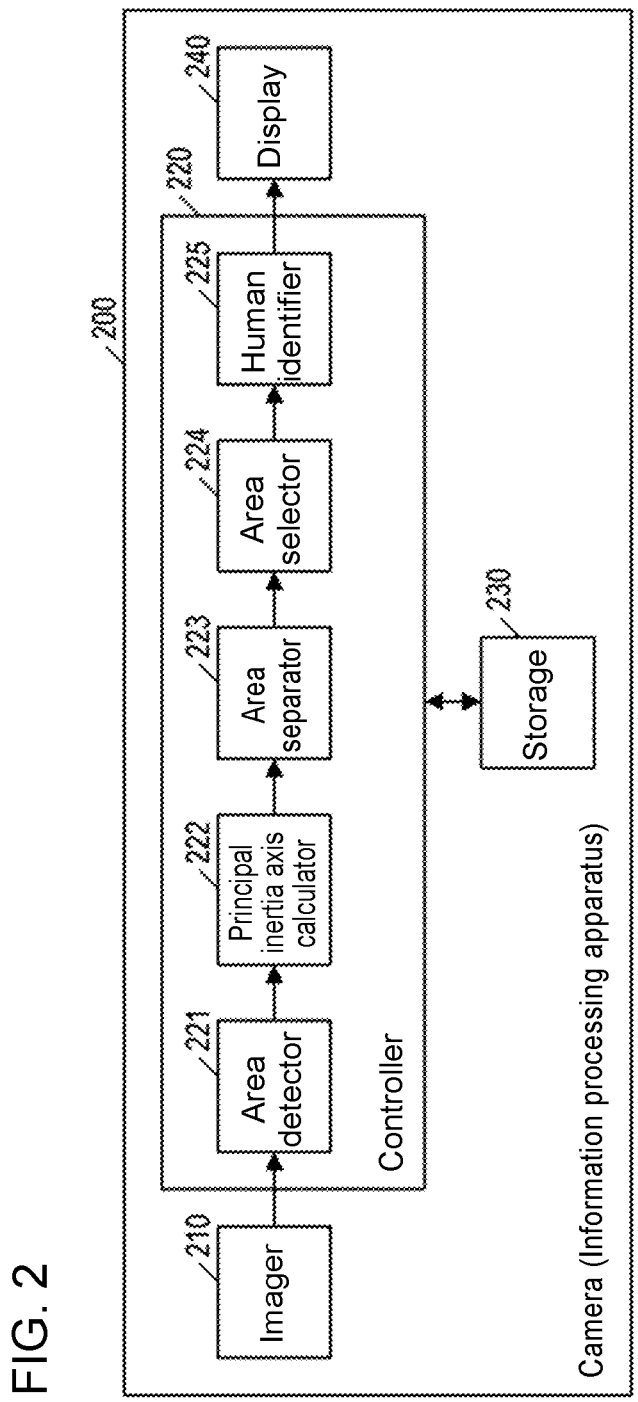
FIG. 2 is a block diagram of a camera (information processing device) according to a first embodiment of the present invention showing an example structure.

FIG. 2 is a block diagram of a camera 200 (information processing device) according to the first embodiment showing an example structure. The camera 200 includes an imager 210, a controller 220, a storage 230, and a display 240.

Although the technique is used for a camera in the first embodiment, the present invention is applicable to any other information processing device. For example, the present invention is applicable to a personal computer (PC) separate from the camera (imager 210). The display 240 may be a display device (monitor) separate from the information processing device according to an embodiment of the present invention. The information processing device according to an embodiment of the present invention separate from the camera may be installed at any location. For example, the information processing device may or may not be installed in the same room as the camera. The above PC may be a cloud computer or any terminal such as a smartphone or a tablet.

The imager 210 captures an image and outputs the image to the controller 220. In the first embodiment, the imager 210 captures a video. The imager 210 captures frames of a video and then outputs the frames to the controller 220. The imager 210 may capture a still image and then output the still image to the controller 220.

The controller 220 includes, for example, a central processing unit (CPU), a random-access memory (RAM), and a read-only memory (ROM) to control each unit and perform various information processes.

The storage 230 stores programs executable by the controller 220 and various data sets to be used in the controller 220. For example, the storage 230 is an auxiliary storage device such as a hard disk drive or a solid-state drive.

The display 240 displays information output from the controller 220.

The controller 220 will be described in more detail. The controller 220 includes an area detector 221, a principal inertia axis calculator 222, an area separator 223, an area selector 224, and a human identifier 225.

The area detector 221 detects a feature area with a predetermined feature from an image captured with the imager 210. The area detector 221 outputs the image captured with the imager 210 and information indicating the detected feature area to the principal inertia axis calculator 222. The feature area may be, for example, an area with motions, an area with pixel values (e.g., RGB values or luminance values) within a predetermined range, or an area surrounded by edges. In other words, the area with the predetermined feature includes, for example, an area with motions, an area with pixel values within a predetermined range, and an area surrounded by edges. The predetermined range is, for example, a range of possible pixel values of a predetermined object (a human in the first embodiment). An imaging environment (e.g., sunlight or light from an illuminator) varies with time. Thus, the predetermined range may vary with time. The area detector 221 is an example of a detector in an aspect of the present invention.

The feature area may be detected with any of various known methods (e.g., a method for determining whether the area includes motions or a method for detecting edges). The area may be determined to include or not to include motions using background subtraction or interframe subtraction. For example, the background subtraction method detects, as a pixel with any motion in a captured image, a pixel having a difference (an absolute value) greater than or equal to a predetermined threshold from a pixel value of a predetermined background image. For example, the interframe subtraction method detects, as a pixel with any motion in a captured current image (in a current frame), a pixel having a difference greater than or equal to a predetermined threshold from a pixel value of a captured past image (a past frame). The interframe subtraction method may use, as the past frame, a frame preceding a predetermined number of frames before the current frame. The predetermined number is greater than or equal to 1. The predetermined number of frames (the number of frames between the current frame and the past frame) may be determined based on the frame rate of processing performed by the controller 220 and the frame rate of imaging performed with the imager 210.

The principal inertia axis calculator 222 calculates a principal inertia axis of the feature area based on information indicating the feature area detected by the area detector 221. The principal inertia axis calculator 222 then outputs the image captured with the imager 210, the information indicating the feature area detected by the area detector 221, and information indicating the calculated principal inertia axis to the area separator 223. The principal inertia axis may be calculated with any of known various methods.

The area separator 223 obtains two separate areas by separating the feature area detected by the area detector 221 along the principal inertia axis calculated along the principal inertia axis calculator 222. The area separator 223 then outputs the image captured with the imager 210, the information indicating the feature area detected by the area detector 221, and information indicating the two resultant separate areas to the area selector 224. The area separator 223 is an example of a separator in an aspect of the present invention.

The area selector 224 determines whether to use the two separate areas obtained by the area separator 223 or use the feature area detected by the area detector 221 (selects the area to be used). The area selector 224 is an example of a determiner in an aspect of the present invention.

The use of a principal inertia axis may be inappropriate in separating, for example, a detected feature area substantially equal to an area of an object that is not to be separated. Such a feature area tends to occupy a large proportion of a rectangle circumscribing the feature area. When an evaluation value corresponding to the proportion of the feature area occupying the rectangle circumscribing the feature area is less than a predetermined threshold, the area selector 224 determines to use the two separate areas. When the evaluation value is greater than or equal to the predetermined threshold, the area selector 224 determines to use the feature area. This accurately allows more appropriate separation of the feature area (using the resultant separate areas when the feature area is to be separated and using the feature area instead of the resultant separate areas when the feature area is not to be separated).

In the first embodiment, the area selector 224 calculates the rectangle circumscribing the feature area based on the information indicating the feature area detected by the area detector 221. The area selector 224 also calculates the rectangles circumscribing the two separate areas based on the information indicating the two separate areas obtained by the area separator 223. The area selector 224 then calculates, as the evaluation value, the proportion of the total area of the rectangles circumscribing the two separate areas to the area of the rectangle circumscribing the feature area (the number of pixels in the circumscribed rectangle).

The proportion of the area of the logical sum of the rectangles circumscribing the two separate areas to the area of the rectangle circumscribing the feature area may be calculated as the evaluation value. This allows calculation of an evaluation value closer to the proportion of the feature area occupying the rectangle circumscribing the feature area, thus allowing determination as to whether the area is used more appropriately. The proportion of the feature area occupying the rectangle circumscribing the feature area, or in other words, the proportion of the feature area to the area of the rectangle circumscribing the feature area may be calculated as the evaluation value.

After selecting the area to be used, the area selector 224 outputs the image captured with the imager 210 and information indicating the rectangle circumscribing the selected area to the human identifier 225.

The human identifier 225 identifies an object included in the rectangle circumscribing the selected area as a human (predetermined object) based on the information (image captured with the imager 210 and the information indicating the rectangle circumscribing the selected area) output from the area selector 224. When the two separate areas are selected, the human identifier 225 identifies, as a human or as another object, the object included in the rectangle circumscribing each of the two separate areas. This accurately allows identification (detection) of a human. For example, the feature area including a human is separated into separate areas more similar to the human area. The object included in the rectangle circumscribing each of the resultant separate areas can be identified (detected) as a human more accurately than when the rectangle circumscribing the feature area is used. The human identifier 225 is an example of an identifier in an aspect of the present invention.

After identifying the human, the human identifier 225 outputs the image captured with the imager 210 and the result of human identification to the display 240. The display 240 can thus display the result of human identification together with the captured image. The result of human identification includes, for example, information indicating the rectangle circumscribing the selected area and information indicating whether the object included in the circumscribed rectangle is a human. The display 240 then superimposes the rectangle circumscribing the selected area on the captured image and displays the resultant image. The characteristics of the circumscribed rectangle (e.g., the line type, luminance, and color) are changeable depending on whether an object included in the circumscribed rectangle is a human.

The human identifier 225 may record the result of human identification onto a storage medium in a manner associated with the captured image. The storage medium may or may not be a part of the camera 200.

Any algorithm may be used for human identification performed by the human identifier 225. For example, an identifier that combines an image feature such as the histogram of oriented gradients (HoG) or a Haar-like feature and boosting may be used. A trained model generated by known machine learning, or specifically a trained model generated by deep learning may be used. For examples, a region-based convolutional neural networks (R-CNN), Fast R-CNN, you only look once (YOLO), or a single shot multibox detector (SSD) may be used.

Figure 3:
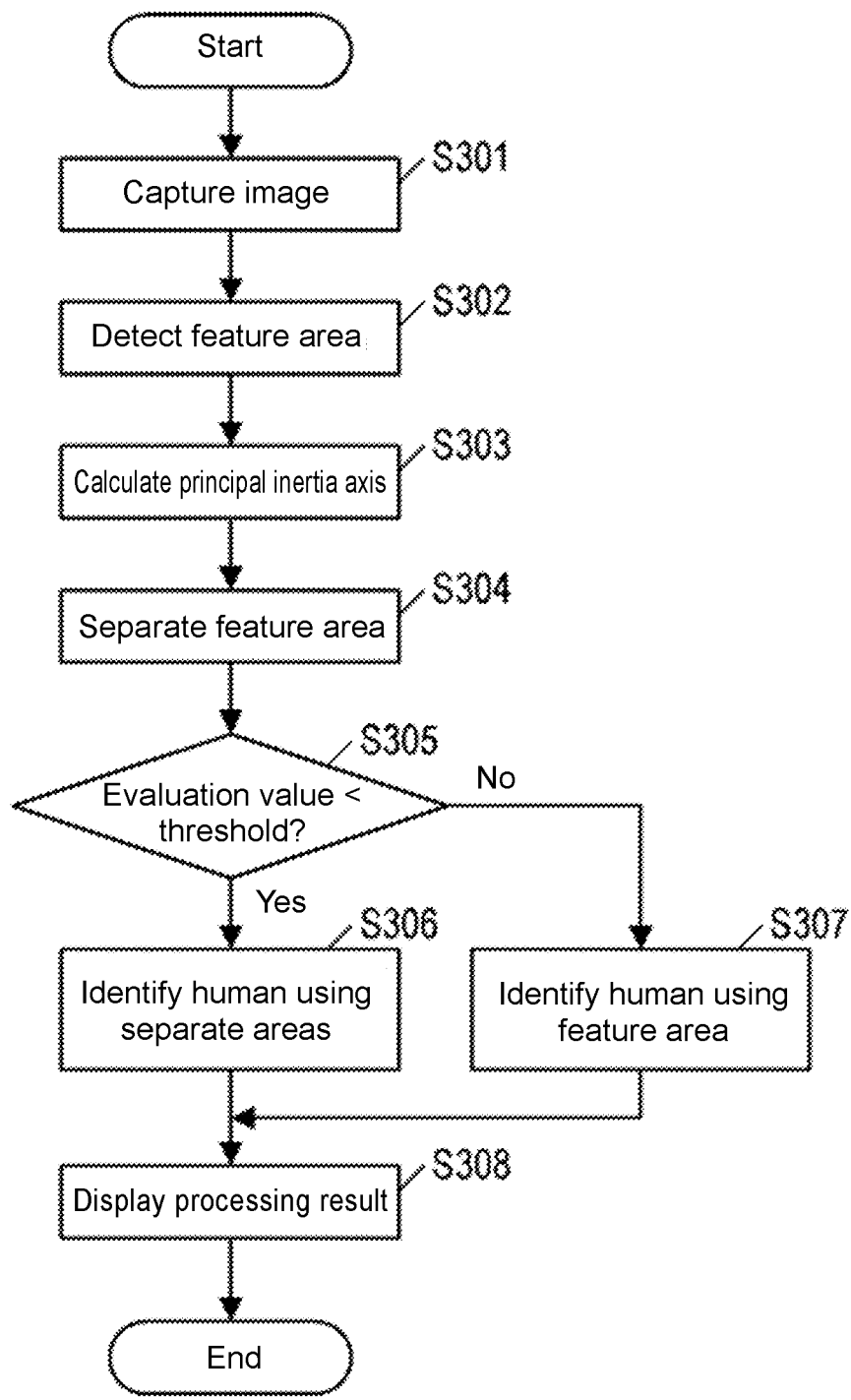
FIG. 3 is a flowchart of an example process performed by the camera according to the first embodiment of the present invention.

FIG. 3 is a flowchart of an example process performed by the camera 200. The camera 200 repeatedly performs the process in FIG. 3. Although the frame rate (repetition cycle) in the processing performed by the controller 220 is not limited, the frame rate is equal to the frame rate (e.g., 30 fps) of the imaging performed by the imager 210 in the first embodiment.

The imager 210 first captures an image (step S301). The area detector 221 detects a feature area with a predetermined feature from the image captured in step S301 (step S302). The principal inertia axis calculator 222 then calculates a principal inertia axis of the feature area detected in step S302 (step S303). The area separator 223 then separates the feature area detected in step S302 along the principal inertia axis calculated in step S303 into two separate areas (step S304).

The area selector 224 then calculates an evaluation value based the feature area detected in step S302 and the two separate areas obtained in step S304 to determine whether the calculated evaluation value is less than the predetermined threshold (step S305). When the evaluation value is determined to be less than the predetermined threshold (Yes in step S305), the processing advances to step S306. When the evaluation value is determined to be greater than or equal to the predetermined threshold (No in step S305), the processing advances to step S307.

In step S306, the human identifier 225 identifies, as a human or another object, an object included in the rectangle circumscribing each of the two separate areas obtained in step S304. In step S307, the human identifier 225 identifies, as a human or another object, an object included in the rectangle circumscribing the feature area detected in step S302. After the processing in step S306 or step S307, the processing advances to step S308. In step S308, the display 240 displays the result from the processing in steps S301 to S307.

Figure 4:
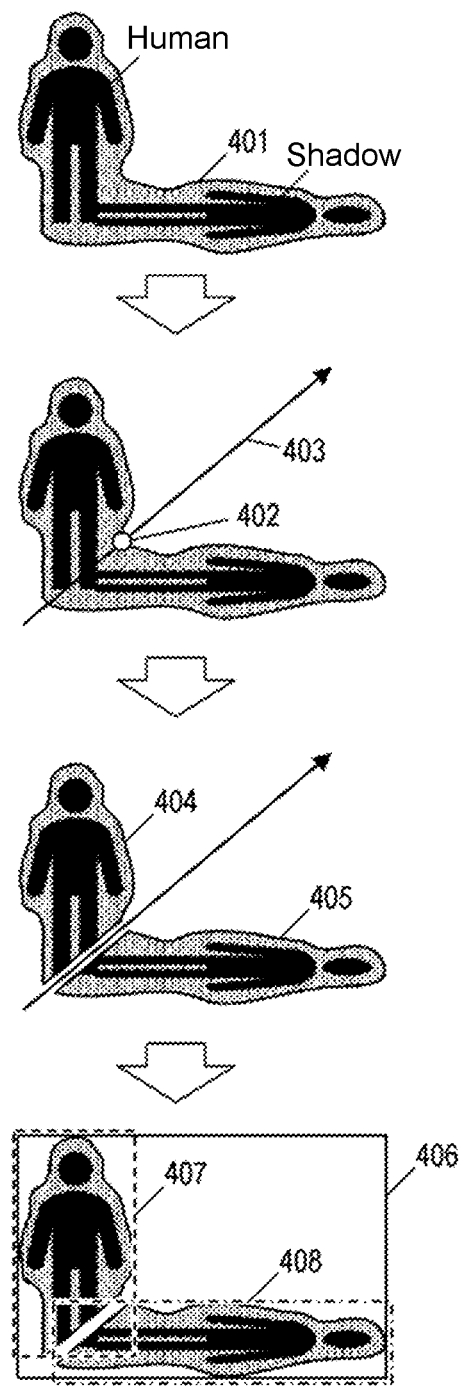
FIG. 4 is a diagram showing a specific operation example of the camera according to the first embodiment of the present invention.

A specific operation example of the camera 200 will be described with reference to FIG. 4. In the example of FIG. 4, a feature area 401 including a human and its shadow is detected (step S302). To accurately identify a human, the feature area 401 is to be separated into a human area and a shadow area. The principal inertia axis calculator 222 calculates a gravity center 402 of the feature area 401 and a principal inertia axis 403 of the feature area 401 including the gravity center 402 (step S303). The area separator 223 then separates the feature area 401 along the principal inertia axis 403 into two separate areas 404 and 405 (step S304). As shown in FIG. 4, the separate area 404 corresponds to the human, and the separate area 405 corresponds to the shadow. The separate areas 404 and 405 are thus to be used in human identification. The area selector 224 calculates a circumscribed rectangle 406 of the feature area 401, a circumscribed rectangle 407 of the separate area 404, and a circumscribed rectangle 408 of the separate area 405. The area selector 224 then calculates, as the evaluation value, the proportion of the sum of the areas (total area) of the circumscribed rectangles 407 and 408 to the area of the circumscribed rectangle 406. As shown in FIG. 4, a relatively low value (a value less than the predetermined threshold) is obtained as the evaluation value (Yes in step S305). The separate areas 404 and 405 are thus used to identify the human (step S306).

Figure 5:
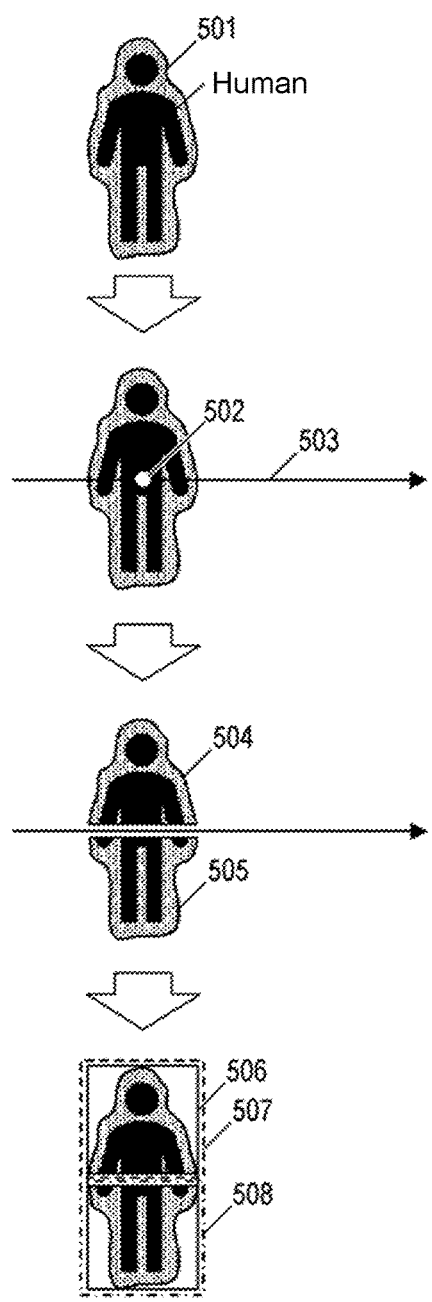
FIG. 5 is a diagram showing a specific operation example of the camera according to the first embodiment of the present invention.

Another specific operation example of the camera 200 will be described with reference to FIG. 5. In the example of FIG. 5, a feature area 501 substantially equal to a human area is detected (step S302). To identify the human accurately, the feature area 501 is not to be separated. The principal inertia axis calculator 222 calculates a gravity center 502 of the feature area 501 and a principal inertia axis 503 of the feature area 501 including the gravity center 502 (step S303). The area separator 223 then separates the feature area 501 along the principal inertia axis 503 into two separate areas 504 and 505 (step S304). As shown in FIG. 5, the separate area 504 corresponds to an upper half of the body of the human, and the separate area 505 corresponds to a lower half of the body of the human. Human identification using the separate areas 504 and 505 may not detect a human or may detect a part of a human. The human identification is thus to be performed using the feature area 501 instead of using the separate areas 504 and 505. The area selector 224 calculates a circumscribed rectangle 506 of the feature area 501, a circumscribed rectangle 507 of the separate area 504, and a circumscribed rectangle 508 of the separate area 505. The area selector 224 then calculates, as the evaluation value, the proportion of the sum of the areas (total area) of the circumscribed rectangles 507 and 508 to the area of the circumscribed rectangle 506. As shown in FIG. 5, a relatively great value (a value greater than or equal to the predetermined threshold) is obtained as the evaluation value (No in step S305). The human identification can thus be performed using the feature area 501 instead of using the separate areas 504 and 505 (step S306).

Figure 6:
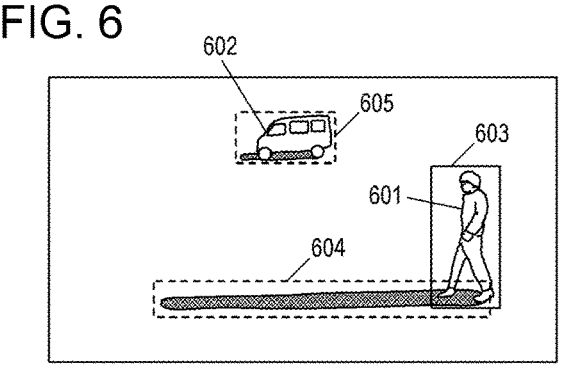
FIG. 6 is a diagram of an example display in the first embodiment of the present invention.

FIG. 6 is a diagram of an example display performed by the display 240. In FIG. 6, the captured image includes a human 601, an automobile 602, and their shadows. The human 601 has an evaluation value less than the threshold. The display 240 thus displays a frame 603 (rectangle circumscribing the separate area) including the human 601 and a frame 604 (rectangle circumscribing the separate area) including the shadow of the human 601. The automobile 602 has an evaluation value greater than or equal to the threshold. The display 240 thus displays a frame 605 (rectangle circumscribing the feature area) including the automobile 602 and its shadow. An object included in the frame 603 is identified as a human, and an object included in each of the frames 604 and 605 is not identified as a human. Thus, the frame 603 is indicated by a solid line, and the frames 604 and 605 are indicated by broken lines.

As described above, the structure according to the first embodiment separates the feature area along a principal inertia axis of the feature areas. This allows more appropriate separation of the feature area (into two separate areas corresponding to the respective intended two objects). The structure also determines whether the two separate areas obtained by separating the feature area are to be used or the feature area is to be used based on the evaluation value corresponding to the proportion of the feature area occupying the rectangle circumscribing the feature area. This accurately allows more appropriate separation of the feature area (using the resultant separate areas when the feature area is to be separated and using the feature area instead of the resultant separate areas when the feature area is not to be separated).

Second Embodiment

A second embodiment of the present invention will be described. The feature area has two principal inertia axes and may not be separated appropriately depending on the principal inertial axis used for the separation. The structure according to the second embodiment selects the principal inertia axis to be used to separate the feature area more appropriately and reliably.

Figure 7:
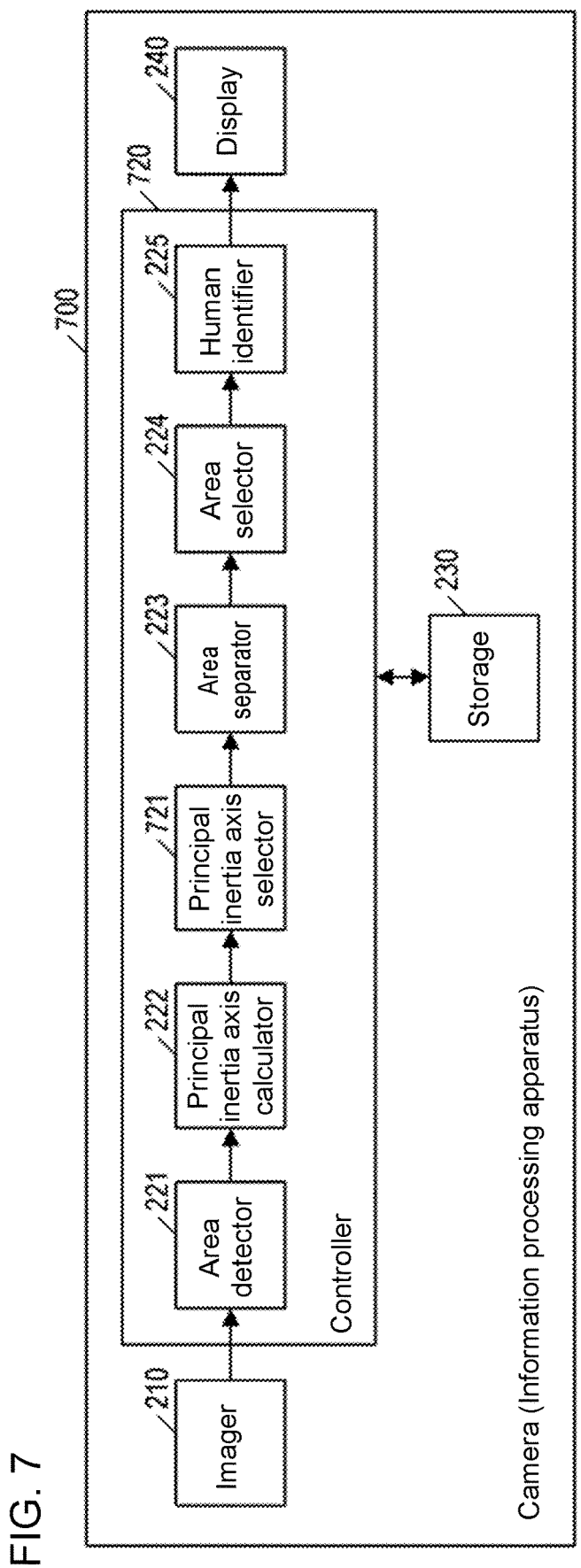
FIG. 7 is a block diagram of a camera (information processing device) according to a second embodiment of the present invention showing an example structure.

FIG. 7 is a block diagram of a camera 700 (information processing device) according to the second embodiment. The camera 700 includes an imager 210, a controller 720, a storage 230, and a display 240. The controller 720 has the same function as the controller 220 (FIG. 2). The controller 720 includes an area detector 221, a principal inertia axis calculator 222, a principal inertia axis selector 721, an area separator 223, an area selector 224, and a human identifier 225.

The principal inertia axis calculator 222 outputs an image captured with the imager 210, information indicating a feature area detected by the area detector 221, and information indicating the calculated principal inertia axis or principal inertia axes to the principal inertia axis selector 721. In the second embodiment, the principal inertia axis calculator 222 may or may not calculate two principal inertia axes of the feature area. For example, the principal inertia axis calculator 222 may calculate one of the two principal inertia axes, and the principal inertia axis selector 721 may correct the principal inertia axis calculated along the principal inertia axis calculator 222 as appropriate to obtain the other of the two principal inertia axes.

The principal inertia axis selector 721 selects one of the two principal inertia axes of the feature area. When the center of gravity of the feature area is located in the first or third quadrant of the four quadrants obtained with the horizontal and vertical axes including the center of the rectangle circumscribing the feature area, the principal inertia axis with a smaller declination from the horizontal axis (horizontal direction) of the two principal inertia axes is selected. When the center of gravity of the feature area is located in the second or fourth quadrant of the four quadrants, the principal inertia axis with a greater declination from the horizontal axis (horizontal direction) of the two principal inertia axes is selected. The principal inertia axis selector 721 then outputs the image captured with the imager 210, the information indicating the feature area detected by the area detector 221, and the information indicating the selected principal inertia axis to the area separator 223. The area separator 223 separates the feature area detected by the area detector 221 along the principal inertia axis selected along the principal inertia axis selector 721. This allows more appropriate (and reliable) separation of the feature area.

Figure 8:
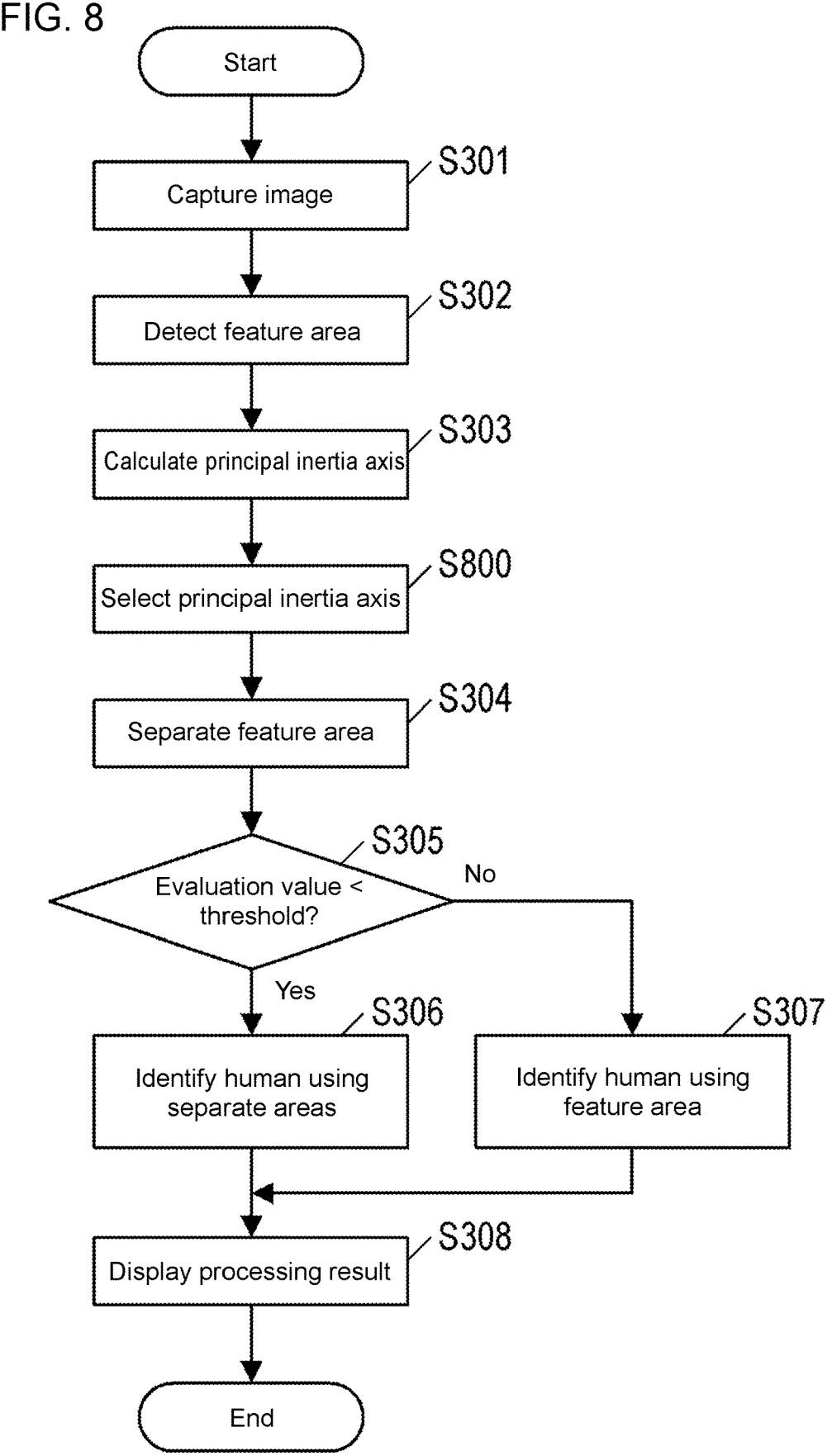
FIG. 8 is a flowchart of an example process performed by the camera according to the second embodiment of the present invention.

FIG. 8 is a flowchart of an example process performed by the camera 700. The camera 700 repeatedly performs the process in FIG. 8. Although the frame rate (repetition cycle) in the processing performed by the controller 720 is not limited, the frame rate is equal to the frame rate (e.g., 30 fps) of the imaging performed by the imager 210 in the second embodiment.

In the process in FIG. 8, the processing in step S800 is performed between the processing in steps S303 and S304. In step S800, the principal inertia axis selector 721 selects one of the two principal inertia axes calculated in step S303. In step S304, the area separator 223 separates the feature area detected in step S302 along the principal inertia axis selected in step S800.

A specific operation example of the camera 700 will be described with reference to FIG. 9.

Figure 9:
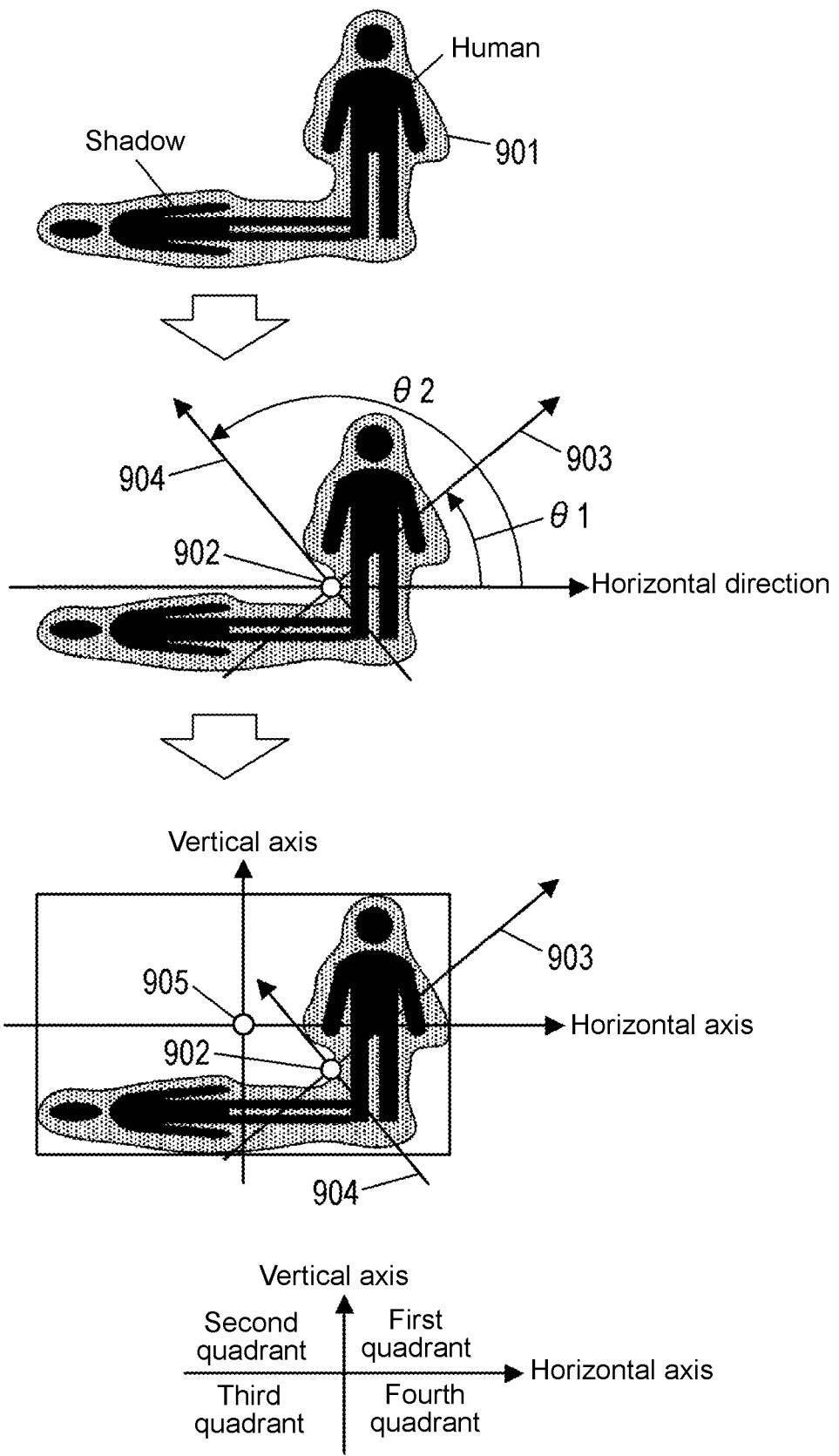
FIG. 9 is a diagram showing a specific operation example of the camera according to the second embodiment of the present invention.

In the example of FIG. 9, a feature area 901 including a human and its shadow is detected (step S302). To accurately identify a human, the feature area 901 is to be separated into a human area and a shadow area. The principal inertia axis calculator 222 calculates a gravity center 902 of the feature area 901 and principal inertia axes 903 and 904 of the feature area 901 including the gravity center 902 (step S303). A declination angle $\theta 1$ from the horizontal direction to the principal inertia axis 903 is smaller than a declination angle $\theta 2$ from the horizontal direction to the principal inertia axis 904. With the principal inertia axis 903 and the principal inertia axis 904 orthogonal to each other, the declination angle $\theta 2$ is thus a declination angle $\theta 1+90°$.

The principal inertia axis selector 721 selects one of the principal inertia axes 903 and 904 (step S800). As shown in FIG. 9, the feature area 901 cannot be separated into a human area and a shadow area along the principal inertia axis 903, and can be separated into a human area and a shadow area along the principal inertia axis 904. The principal inertia axis selector 721 is thus to select the principal inertia axis 904.

The principal inertia axis selector 721 calculates the gravity center 902 of the feature area 901 and a center 905 of the rectangle circumscribing the feature area 901 based on the information indicating the feature area detected by the area detector 221. The principal inertia axis selector 721 then determines the quadrant including the gravity center 902 of the four quadrants obtained with the horizontal and vertical axes including the center 905 based on the coordinates of the gravity center 902 and the coordinates of the center 905. In FIG. 9, the horizontal coordinate (horizontal position coordinate) may increase in the direction of the arrow indicated as the horizontal axis, and the vertical coordinate (vertical position coordinate) may increase in the direction of the arrow indicated as the vertical axis. In this case, when the horizontal coordinate of the gravity center 902 is greater than the horizontal coordinate of the center 905 and the vertical coordinate of the gravity center 902 is greater than the vertical coordinate of the center 905, the gravity center 901 is determined to be located in the first quadrant. When the horizontal coordinate of the gravity center 902 is less than the horizontal coordinate of the center 905 and the vertical coordinate of the gravity center 902 is greater than the vertical coordinate of the center 905, the gravity center 901 is determined to be located in the second quadrant. When the horizontal coordinate of the gravity center 902 is less than the horizontal coordinate of the center 905 and the vertical coordinate of the gravity center 902 is less than the vertical coordinate of the center 905, the gravity center 901 is determined to be located in the third quadrant. When the horizontal coordinate of the gravity center 902 is greater than the horizontal coordinate of the center 905 and the vertical coordinate of the gravity center 902 is less than the vertical coordinate of the center 905, the gravity center 901 is determined to be located in the fourth quadrant.

The principal inertia axis selector 721 selects one of the principal inertia axes 903 and 904 based on the determination result of the quadrant including the gravity center 902. When the gravity center 902 is located in the first quadrant or the third quadrant, the principal inertia axis selector 721 selects the principal inertia axis 903 with a smaller declination from the horizontal axis (horizontal direction) of the principal inertia axes 903 and 904. When the gravity center 902 is located in the second quadrant or the fourth quadrant, the principal inertia axis selector 721 selects the principal inertia axis 904 with a greater declination from the horizontal axis of the principal inertia axes 903 and 904. In FIG. 9, the gravity center 902 located in the fourth quadrant allows the principal inertia axis selector 721 to select the principal inertia axis 904. This thus allows the feature area 901 to be separated into the human area and the shadow area.

As described above, the structure in the second embodiment selects the principal inertia axis to be used based on the quadrant including the center of gravity of the feature area of the four quadrants obtained with the horizontal axis and the vertical axis including the center of the rectangle circumscribing the feature area. This allows more appropriate and reliable separation of the feature area.

Others

Figure 10A:
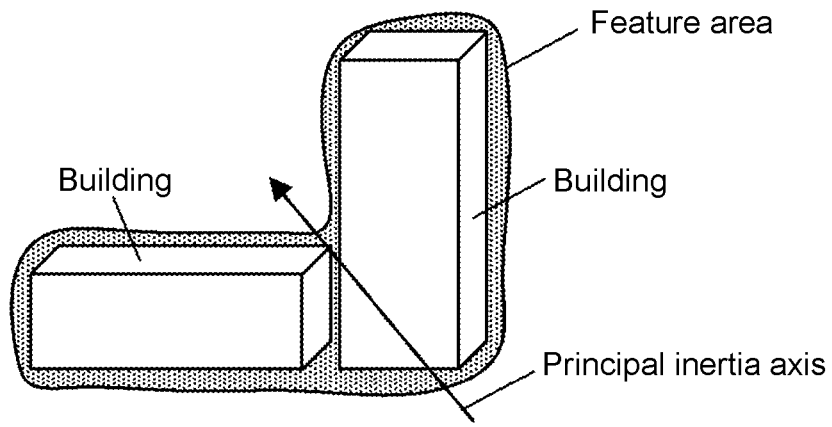
FIGS. 10A to 10C are diagrams of example separate areas.
Figure 10B:
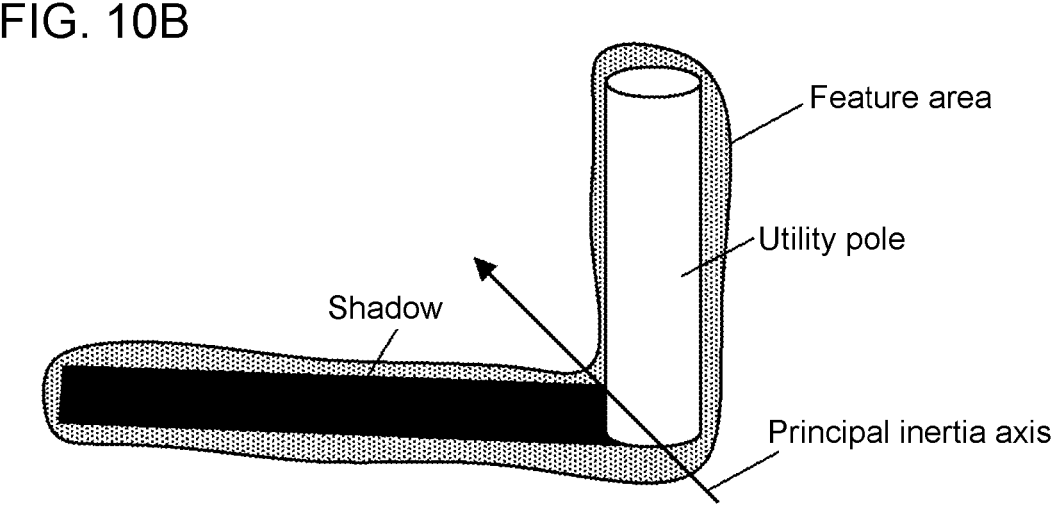
Figure 10C:
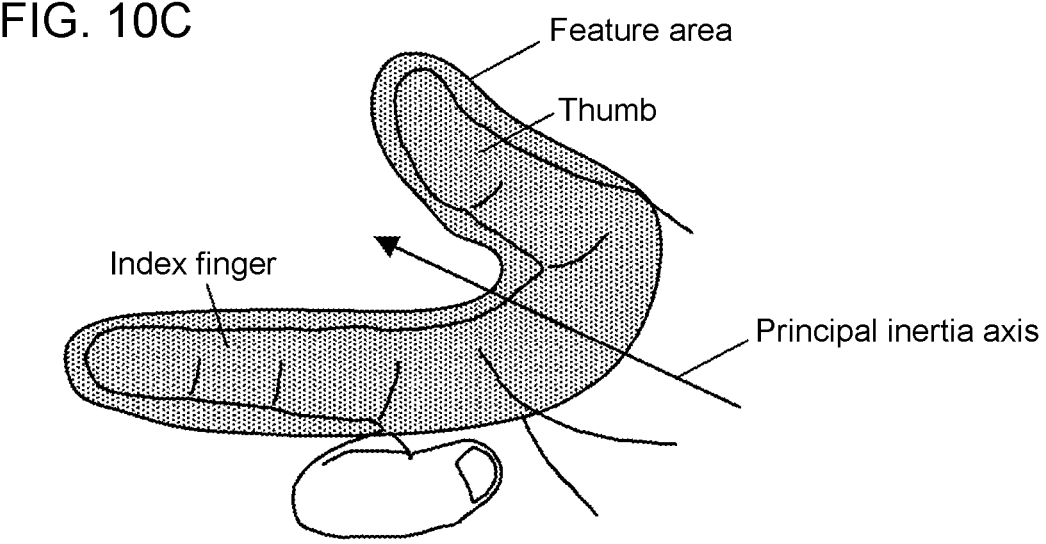

The above embodiments describe exemplary structures according to one or more aspects of the present invention. The present invention is not limited to the specific embodiments described above, but may be modified variously within the scope of the technical ideas of the invention. For example, the predetermined object to be identified may be an automobile, a building, a finger, an arm, a torso, and an animal, instead of a human. In the embodiments, the feature area is separated into the human area and the shadow area. However, the feature area may be separated in a different manner. In some embodiments of the present invention, a feature area is separated into two buildings (two areas corresponding to the two buildings) as shown in FIG. 10A. As shown in FIG. 10B, a feature area may be separated into a utility pole area and its shadow area. As shown in FIG. 10C, a feature area may be separated into a thumb area and an index finger area. A feature area (human area) may be separated into a torso area and an arm area. As described above, the technique according to the embodiments of the present invention may have various uses.

Appendix 1

An information processing device (100, 200, 700), comprising:
 a detector (101, 221) configured to detect a feature area with a predetermined feature from a captured image; and
 a separator (102, 223) configured to separate the feature area along a principal inertia axis of the feature area.

Appendix 2

An information processing method, comprising:
(S302) detecting a feature area with a predetermined feature from a captured image; and
(S304) separating the feature area along a principal inertia axis of the feature area.

REFERENCE SIGNS LIST

100: information processing device
101: area detector
102: area separator
200: camera (information processing device)
210: imager
220: controller
230: storage
240: display
221: area detector
222: principal inertia axis calculator
223: area separator
224: area selector
225: human identifier
700: information processing device
720: controller
721: principal inertia axis selector

The invention claimed is:
1. An information processing device, comprising:
 a detector configured to detect a feature area including an object and a shadow of the object from a captured image; and
 a separator configured to separate the feature area along a principal inertia axis of the feature area, wherein
 when a center of gravity of the feature area is located in a first quadrant or a third quadrant of four quadrants obtained with a horizontal axis and a vertical axis including a center of a rectangle circumscribing the feature area, the separator separates the feature area into an area of the object and an area of the shadow along, of two principal inertia axes of the feature area, a principal inertia axis with a smaller declination from the horizontal axis, and
 when the center of gravity of the feature area is located in a second quadrant or a fourth quadrant of the four quadrants, the separator separates the feature area into the area of the object and the area of the shadow along, of the two principal inertia axes of the feature area, a principal inertia axis with a greater declination from the horizontal axis.

2. The information processing device according to claim 1, further comprising:
a determiner configured to determine whether two separate areas obtained by separating the feature area with the separator are used or the feature area is used,
wherein when an evaluation value corresponding to a proportion of the feature area occupying a rectangle circumscribing the feature area is less than a predetermined threshold, the determiner determines to use the two separate areas, and
when the evaluation value is greater than or equal to the predetermined threshold, the determiner determines to use the feature area.

3. The information processing device according to claim 2, wherein
the evaluation value is a proportion of a total area of rectangles circumscribing the two separate areas to an area of the rectangle circumscribing the feature area.

4. The information processing device according to claim 2, wherein
the evaluation value is a proportion of a logical sum of areas of rectangles circumscribing the two separate areas to an area of the rectangle circumscribing the feature area.

5. The information processing device according to claim 2, further comprising:
an identifier configured to identify an object included in a rectangle circumscribing an area to be used as a predetermined object or another object,
wherein when the two separate areas are to be used, the identifier identifies, as the predetermined object or another object, an object included in a rectangle circumscribing each of the two separate areas.

6. The information processing device according to claim 5, wherein
the predetermined object is a human.

7. The information processing device according to claim 1, wherein
the detector detects an area with a motion as the feature area.

8. The information processing device according to claim 1, wherein
the detector detects an area having a pixel value within a predetermined range as the feature area.

9. The information processing device according to claim 1, wherein
the detector detects an area surrounded by an edge as the feature area.

10. An information processing method, comprising:
detecting a feature area including an object and a shadow of the object from a captured image; and
separating the feature area along a principal inertia axis of the feature area, wherein
when a center of gravity of the feature area is located in a first quadrant or a third quadrant of four quadrants obtained with a horizontal axis and a vertical axis including a center of a rectangle circumscribing the feature area, the feature area is separated into an area of the object and an area of the shadow along, of two principal inertia axes of the feature area, a principal inertia axis with a smaller declination from the horizontal axis, and
when the center of gravity of the feature area is located in a second quadrant or a fourth quadrant of the four quadrants, the feature area is separated into the area of the object and the area of the shadow along, of the two principal inertia axes of the feature area, a principal inertia axis with a greater declination from the horizontal axis.

11. A non-transitory computer readable medium storing a program for causing a computer to perform operations included in the information processing method according to claim 10.

* * * * *